Figure 1:
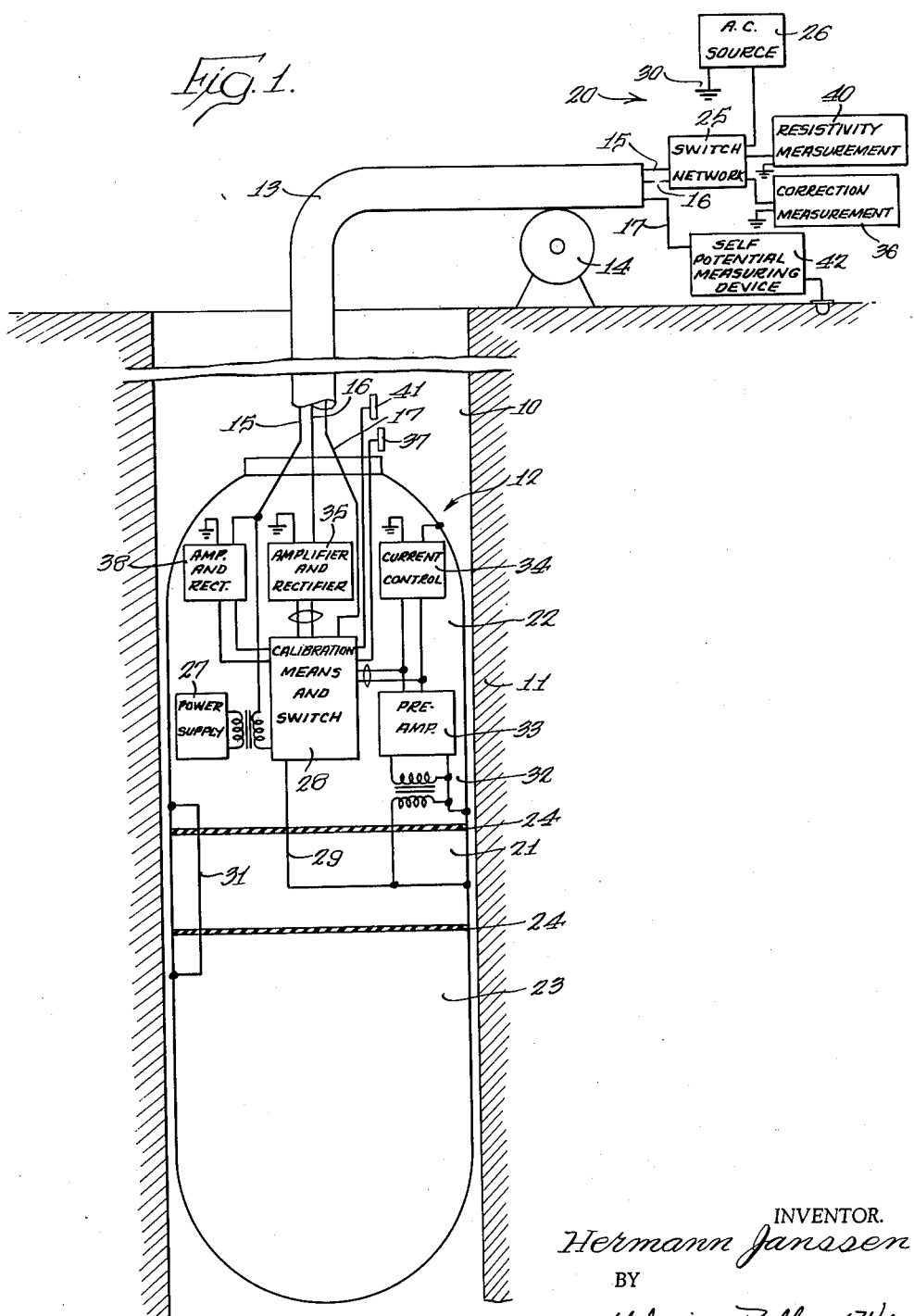

Jan. 3, 1961  H. JANSSEN  2,967,272
ELECTRICAL WELL LOGGING
Filed March 27, 1957  2 Sheets-Sheet 1

INVENTOR.
Hermann Janssen
BY
Mason, Kolehmainen, Rathburn & Wyss
Attys.

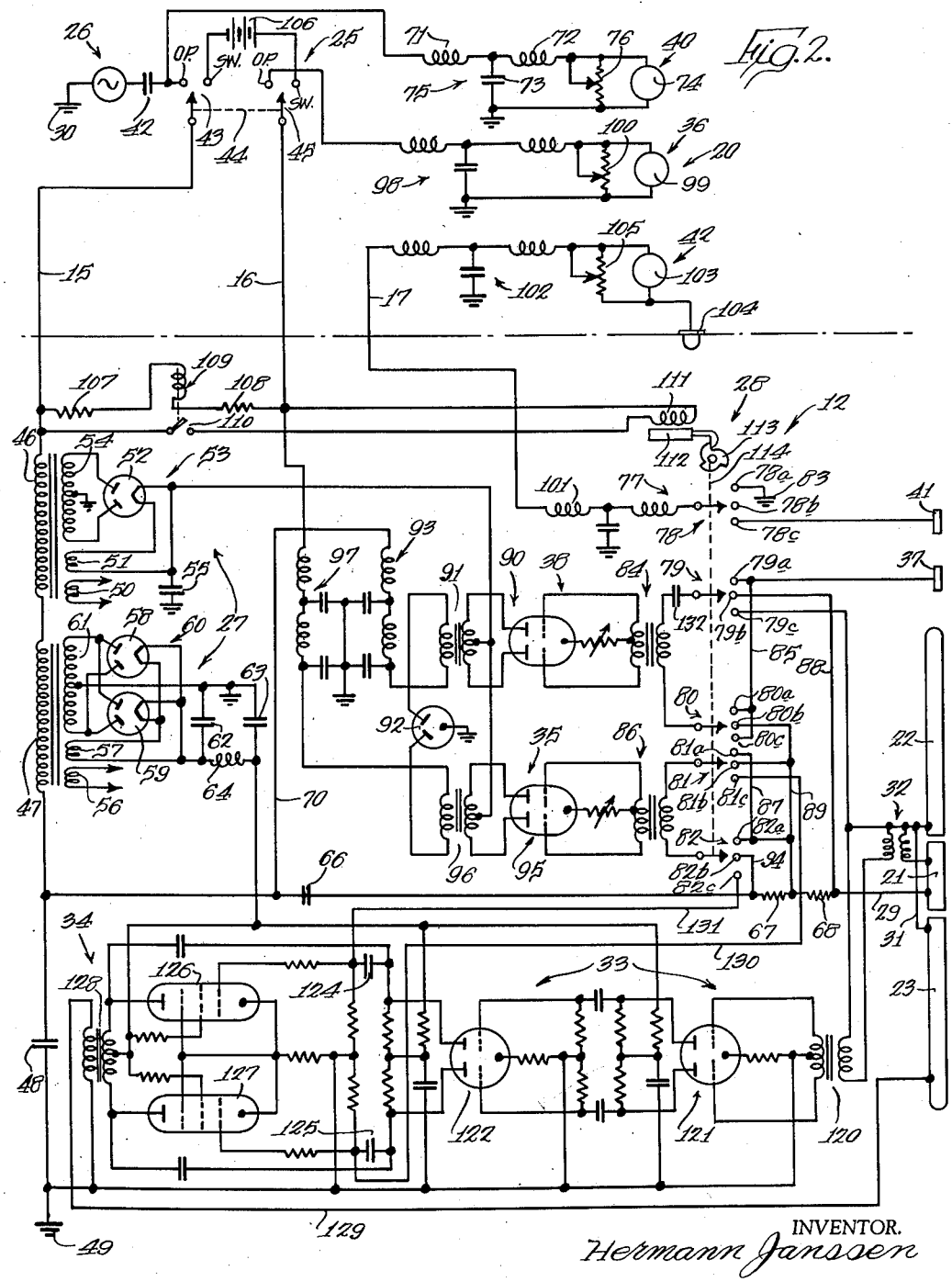

United States Patent Office 2,967,272
Patented Jan. 3, 1961

2,967,272

ELECTRICAL WELL LOGGING

Hermann Janssen, Kiel, Germany, assignor, by mesne assignments, to PGAC Development Company, Houston, Tex., a corporation of Texas Filed Mar. 27, 1957, Ser. No. 648,892

12 Claims. (Cl. 324—1)

The present invention relates generally to electrical well logging of formations adjacent a borehole and, more particularly, to improvements in electrical well logging systems of the type in which an electrical survey current is forced into the formations in the form of a thin sheet or disk extending perpendicular to the borehole in order to facilitate the production of resistivity measurements which are especially useful in locating and identifying relatively thin strata in the formations.

In the systems of the type referred to electrodes which are conventionally termed guard or screen electrodes, are disposed symmetrically above and below one or more current emitting electrodes and the potential of the screen electrodes is controlled in order to create electric fields which block the flow of current longitudinally of the borehole, thereby forcing this current to flow laterally into the formations in a direction extending generally perpendicular to the borehole. A resistivity indication is then obtained by measuring the potential difference existing between a point located in the vicinity of the point or points of current emission and a reference point which is infinitely remote therefrom. Such a measurement may be made either by sampling directly the potential difference existing between the current electrode and the remote point or by measuring the difference of potential between the remote point and one or more potential or probe electrodes located adjacent the current electrode. In either case a log is made of the apparent resistivities of the formations as a function of borehole depth to produce a detailed curve characterized by a clear delineation of the successive strata penetrated by the borehole even though these strata may be relatively thin. The measurements obtained are intended to represent the true resistivities of the strata.

To effect these results, the prior art systems for the most part require that a constant current be emitted from the current electrode or electrodes irrespective of variations in contact resistance of the current electrode or of variations in the borehole mud and fluid which would normally be expected to influence the amount of current flow. Moreover, to obtain accurate measurements, these prior art arrangements require that the current source for the guard or screen electrodes be capable of supplying sufficient current to maintain the screen electrodes at substantially the same potential as the current electrodes under all conditions which may be encountered in the borehole. Under certain of these conditions, however, the current demand exceeds the capabilities of the source. Therefore, the satisfaction of both of these requirements is extremely difficult and unless it can be accomplished, the apparent resistivity measurements will deviate from the true resistivities and erroneous indications or measurements will result. When it is considered that the true resistivities may vary from a value near zero to one near infinity, as, for example, from a value of 2 ohm meters to a value in excess of 10,000 ohm meters, the magnitude of the problems involved in satisfying the above-discussed requirements will be apparent.

In accordance with the present invention, due account is taken of variations in the current flow from the current electrode and of the inability of the current source for the screen electrodes to supply excessive amounts of current under the conditions mentioned above and a measurement is made which may be used to correct the apparent resistivity indications in order to obtain true resistivities. At the same time the guard or screen electrodes are maintained at substantially the same potential as the current electrode even under the most adverse borehole conditions.

One of the advantages flowing from the present invention is that the apparent resistivity values are represented upon a linear scale on the measuring device, a factor which facilitates reading and interpretation of the records obtained. Quantitatively correct true resistivities lying beyond the linear range of the measuring device are then obtained, as indicated above, by applying appropriate corrections to the linear range apparent resistivities.

Accordingly, it is an object of the present invention to provide a new and improved electrical logging system of the character indicated above in which a measurement is made representative of the current supplied to the screen electrodes in order to provide information which may be used to correct errors in the apparent resistivity measurements resulting from variations in the measuring current flowing into the borehole formations.

It is a further object of the present invention to provide a well logging system of the type indicated in the preceding object wherein the screen electrodes are maintained at substantially the same potential as the current electrode or electrodes despite variations in the measuring current flowing to the borehole formations and also despite variations in the current flowing to the screen electrodes.

It is also an object of the invention to provide a new and improved electrical logging system in which the apparent resistivity measurements are all produced within the linear range of the measuring device and a second set of measurements is obtained to provide data for correcting the linear range apparent resistivity measurements to quantitatively correct true resistivities even though the latter may fall beyond the linear range of the measuring device.

Another object of the invention is to provide a well logging system of the above character in which indications of variations in the electrical resistivities of the borehole formations are transmitted to the surface of the earth in the form of slowly varying direct current values.

A further object of the invention is to provide a well logging system of the character indicated in the preceding object in which natural potential differences existing between a movable electrode in the borehole and a fixed reference electrode at the surface are transmitted through a cable simultaneously with the slowly varying direct current resistivity signals referred to above.

It is also an object of the invention to provide a system according to the two preceding objects wherein signals representing the amount of current supplied to the screen electrodes are transmitted to the surface of the earth in the form of slowly changing direct current values which flow simultaneously with the natural earth potentials and the direct current signals representing the apparent resistivities.

Still another object of the present invention is to provide a novel calibrating circuit for an electrical logging system of the character described.

The invention, both as to its organization and method of operation, together with further objects and advantages thereof will best be understood with reference to the specification taken in conjunction with the accompanying drawings wherein:

Fig. 1 diagrammatically represents a well logging system characterized by the features of the present invention; and Fig. 2 is a schematic diagram which shows in some detail the circuits represented in block form in Fig. 1.

Referring now to the drawings, the present invention is there illustrated as embodied in an apparatus for electrically logging a well or borehole 10 in order to determine the characteristics of earth formations 11 penetrated or traversed by the borehole. It will be understood that the borehole 10 may contain drilling fluid with mud suspended therein which generally remains in the hole after the removal of the drilling equipment although such fluid has not been illustrated in the drawings.

Investigation apparatus or downhole equipment, indicated generally by the reference character 12, is carried upon the lower end of a multi-conductor cable 13 for movement up or down within the borehole 10. To effect the raising and lowering of the apparatus 12, the cable 13 is trained over a motor driven sheave 14 or the like at the earth's surface and may be wound upon a suitable take-up reel (not shown) in conventional manner. In the form of the invention illustrated, the cable 13 contains three conductors 15, 16 and 17, each of which terminates at one end in the investigation apparatus 12 and at the other end is connected to surface equipment designated generally by the reference character 20.

The downhole equipment 12 comprises a housing which carries on its outer surface a current or measuring electrode 21 and a pair of elongated guard or screen electrodes 22 and 23 respectively disposed above and below the measuring electrodes. The screen electrodes 22 and 23 are interconnected by conductor 31 and are electrically insulated from the measuring electrode 21 by means of suitable insulation indicated by the reference character 24. All three of the electrodes are exposed to the fluid in the borehole.

The conductor 15 is adapted to be connected at its upper end through a manually operated switch network 25 to a suitable source of alternating current 26 which applies a logging or measuring current preferably having a frequency of 400 cycles to the measuring electrode 21. The switch network 25 may be selectively rendered effective either to send the described logging current down the cable, or, alternatively, to supply a switching signal to the apparatus 12 in a manner described more fully below in order to calibrate the surface equipment 20 preparatory to the initiation of a logging operation. The source 26 is so designed that, when the switch network 25 is in its logging or operating position, a constant current is furnished to the downhole equipment 12. This current is used to drive a power supply 27 which supplies filament and B+ signals to electrical components of the sub-surface equipment. The described measuring current is also delivered through a calibration and switch network or circuit 28 and through a signal connector 29 to the measuring electrode 21 from where it passes through the borehole fluid to the formations 11. The circuit for this 400 cycle measuring current is completed through a ground connection 30 at the earth's surface connected to one side of the source 26.

To obtain a resistivity measurement of the formation or stratum lying adjacent the measuring electrode 21, the difference of potential existing between the electrode 21 and a remote reference point, as, for example, the remotely positioned electrode 37 carried on the downhole apparatus at a point spaced some distance from the screen electrode 22 is applied to the calibration and switch circuit 28 to an amplifier and rectifier 38, where the signals are converted to a slowly varying D.C. signal which is passed through cable conductor 15 to the surface equipment 20. At the surface equipment the signals appearing upon conductor 15 are passed through the switch network 25 to a recording galvanometer 40 which provides a continuous indication of the magnitude of these D.C. resistivity signals as a function of borehole depth as the downhole apparatus 12 traverses the borehole.

The borehole 10 is effectively plugged electrically in order to prevent the dispersion of the measuring current along the mud column or the borehole fluid lying adjacent the borehole formations by supplying current to the screen or guard electrodes 22 and 23 of sufficient magnitude to maintain these electrodes at substantially the same potential as the measuring electrode 21. As indicated above, measuring systems of this kind exhibit a focusing effect in which the measuring current flows from the measuring electrode 21 laterally in a thin sheet or disk extending perpendicular to the borehole and having a thickness which is a function of the height of the electrode 21. This measuring current flows laterally into the borehole formations to an extent which is determined by the potential and length of the screen electrodes 22 and 23. As previously mentioned, a large difference of potential between the measuring electrode 21 and the electrically connected screen electrodes 22 and 23, would result in a change of the focusing of the measuring current and, hence, would introduce a substantial error in the determination of the tube resistivity of the formation lying adjacent the electrode 21. To prevent such a potential difference, the gap between the measuring electrode 21 and the screen electrode is bridged by a transformer 32 having an extremely low primary impedance. The secondary of the transformer 32 supplies excitation signals for a preamplifier 33 which in turn excites a current control circuit 34 for supplying current to the screen electrodes 22 and 23.

The proportion of the screen control current to the measuring current depends upon the ratio of the specific resistivity of the stratum lying adjacent the electrode 21 to the adjoining strata lying opposite the screen electrodes 22 and 23. Specifically, the ratio of screen current to measuring current increases when a thin stratum is being investigated, when the specific resistivity of the mud is relatively low or when the ratio of the specific resistivity of the investigated stratum is relatively high in comparison to the resistivity of the adjoining strata. Current ratios of the order of $10^5$ and higher are frequently obtained, and, since the available current from the circuit 34 is limited, the achievement of such a high proportion can be obtained only by keeping the measuring current relatively low.

In the event that the ratio of the focusing current to the measuring current becomes too high for the circuit 34 to follow, small potential difference exists between the measuring electrode 21 and the screen electrodes 22 and 23. Such a potential difference is extremely small due to the low impedance of the transformer 32 even though the current flow through the primary of this transformer is relatively high. However, under these conditions it will be recognized that a portion of the constant current intended for the measuring electrode 21 is diverted through the primary of the transformer 32 to the screen electrodes. This current, after passing through the preamplifiers 33 and through the calibration and switch network 28 referred to above, is amplified and rectified by a circuit 35 which converts the A.C. signals to a slowly varying D.C. signal for passage through conductor 16 to the surface equipment. At the surface, the signals appearing upon the conductor 16 pass through the switch network 25 to a measuring circuit 36 where they are recorded as a function of borehole depth simultaneously with the apparent resistivity measurements provided by the measuring instrument 40. The indication provided by the device 36 is calibrated in terms of percentage of the intended measuring current and this indication is used to correct the apparent resistivity measurement provided by the device 40 in order to obtain the true resistivity of the formations.

Natural earth potentials are recorded simultaneously with the apparent resistivity measurements by supplying the signals picked up by a remotely positioned electrode 41 through the calibration and switch circuit 28 and through the cable conductor 17 to the surface equipment. The difference of potential existing between electrode 41 and a ground or surface electrode are then recorded by a self potential measuring device 42 simultaneously with the signals recorded by the devices 36 and 40. The electrode 41 is preferably located at some distance from the elongated electrode 22 due to the fact that the presence of a long metallic body in the borehole adversely affects the self potential signals present in the vicinity of the long electrodes.

Referring now to Fig. 2 for a detailed description of the circuits described briefly above, it will be observed that the current developed by the source 26 passes through a condenser 42 and through section 43 of a manually operated dual section switch 44 in the network 25 to the cable conductor 15. Specifically, when the switch 44 is in its operating or logging position, the movable blade of section 43 engages the left contact and delivers current from source 26 to conductor 15. The current in conductor 15 passes through the series connected primary windings of a pair of transformers 46 and 47 and through a condenser 48 to ground as indicated at 49. The circuit is, of course, completed as mentioned above, by the ground connection 30 connected to one side of the source 26. Transformer 46 supplies filament voltage for the vacuum tubes employed in the amplifier and rectifier circuits 35 and 38 and also supplies excitation voltage for that portion of the power supply 27 which develops plate voltage for these two amplifier and rectifier circuits. Transformer 47, on the other hand, supplies filament voltage for the vacuum tubes of the preamplifier 33 and the current control circuit 34 and, in addition, supplies excitation potential for that portion of the power supply 27 which develops B+ voltages for the latter circuits. Specifically, transformer 46 includes a secondary winding 50 which supplies a filament voltage for the vacuum tubes of the circuits 35 and 38, a second filament winding 51 for heating a dual diode rectifier tube 52 of a power supply 53 forming a portion of the supply 27, and a third secondary winding 54 which has its opposed ends connected to the plates of the tube 52. The A.C. signal appearing across winding 54 is, of course, full wave rectified in conventional manner to develop B+ signals for the vacuum tubes employed in the amplifier and rectifier circuits 35 and 38. This B+ voltage is filtered by a condenser 55 connected between the B+ bus conductor of the power supply 53 and ground.

In similar manner, the transformer 47 includes a filament winding 56 connected to the filaments of the vacuum tubes employed in the circuits 33 and 34, a second filament winding 57 which is connected to rectifier tubes 58 and 59 of a power supply 60 forming a part of the supply 27, and a third secondary winding 61 which provides A.C. drive for the power supply 60. The vacuum tubes 58 and 59 function as full wave rectifiers to convert the A.C. voltage appearing across secondary winding 61 to a relatively high D.C. signal which is filtered by a conventional $\pi$ network filter consisting of condensers 62 and 63 and inductor 64. The output of the latter filter network serves as the plate and screen supply for the vacuum tubes of the circuits 33 and 34.

The measuring electrode 21 is supplied with an essentially constant current by shunting a small portion of the current passing through conductor 15 to the electrode 21 through a condenser 66 and through series connected calibration resistors 67 and 68. To effect the constant current flow, the impedance of the condenser 66 is relatively high so that changes in contact resistance of the measuring electrode 21 do not appreciably alter the magnitude of the measuring current flowing from the measuring electrode. Condenser 48 serves as a ballast condenser to help maintain the current flow to the measuring electrode 21 at the desired current level.

At the same time that the 400 cycle alternating current from source 26 is flowing down the conductor 15, direct current may flow through this conductor to transmit the apparent resistivity measurements to the surface equipment. To this end the potential difference existing between the measuring electrode 21 and the remote electrode 37 is passed through the amplifier and rectifier circuit 38 through signal connector 70 and through the cable conductor 15 to the measuring circuit 40. The input to the latter measuring circuit preferably includes a conventional T-filter consisting of inductors 71 and 72 and condenser 73, the output of this filter being connected to a recording galvanometer 74. The galvanometer 74 functions to provide a continuous indication of the direct current signal appearing upon conductor 15 in order to produce a log of the apparent resistivity measurements as a function of depth. Such a log may be produced by employing the galvanometer 74 to control the deflection of a light beam impinging upon a light sensitive record medium driven in synchronism with the rotation of sheave 14 although such a medium is not shown in the drawings. A variable resistor 76 is shunted across the recording galvanometer 74 for the purpose of controlling and adjusting the magnitude of the galvanometer deflections when the galvanometer is supplied with a calibrating signal from the downhole equipment in the manner described more fully below. The filter 75, of course, prevents the A.C. current developed by the source 26 from reaching the recording galvanometer 74 and it also eliminates undesired or transient A.C. signals which may be picked up as the desired D.C. signal traverses the cable. Condenser 42 prevents the D.C. signal appearing upon conductor 15 from flowing to the A.C. source 26.

Turning now to a consideration of the manner in which the D.C. signals supplied to cable 15 are developed in the downhole equipment, it will be observed that the input to the amplifier and rectifier circuit 38 passes through the calibration and switch circuit 28. The latter circuit includes a multiple section, three position solenoid operated switch 77 which is adapted to be actuated in response to D.C. signals supplied from the network 25 through cable conductor 15 in a manner described more fully hereinafter. The switch 77 in its first position, termed an "off" position, prevents the flow of signals to the surface equipment 20, in its second position, termed a "calibrate" position, supplies D.C. signals of predetermined amplitude to the surface equipment in order to calibrate the measuring circuits and in a third position, termed the "logging" or "measuring" position, supplies self potential signals through cable conductor 17 to the measuring device 42, supplies the resistivity signals through cable conductor 15 to the recording and measuring circuit 40 and supplies a correction signal through cable conductor 16 to the measuring device 36. Specifically, the stepping switch 77 in its "off" position, that is, with the movable arms of switch sections 78, 79, 80, 81 and 82 in respective engagement with contacts 78a, 79a, 80a, 81a and 82a, conductor 17 is connected to ground as indicated at 83, and as a result, no signals are transmitted to the measuring circuit 42. At the same time, the primary winding of the input transformer 84 for the amplifier and rectifier circuit 38 is shorted via signal connector 85 and the primary winding of the input transformer 86 for the amplifier and rectifier circuit 35 is shorted via signal connector 87. Thus, no signals are transmitted to the surface equipment through the cable conductors 15 and 16. With the stepping switch in its second or "calibrate" position, that is with the blades of the switch sections in engagement with the contacts designated by reference numerals suffixed with the letter "b," cable conductor 17 is confronted by an open circuit condition, the primary winding of transformer 84 is excited by the 400 cycle signal developed across resistor 68 by the flow of measuring current and the primary winding of the transformer 86 is excited by the 400 cycle signal developed across resistor 67. Specifically, contact 79b of switch section 79 is connected to one side of resistor 68 via conductor 88 while switch section 80b is connected to the other side of the resistor 68 via conductor 89. Thus, with the stepping switch in the "calibrate" position and with the uphole switch 44 in the "operate" position, the constant current flowing to the measuring electrode 21 induces a voltage drop across resistor 68 which is applied across the primary winding of the transformer 84. As previously mentioned, the secondary winding of the transformer 84 is connected to provide drive for a conventional push-pull amplifier 90 which amplifies the A.C. input signal and supplies it through an output transformer 91 to one section of a dual diode tube or rectifier 92, where this signal is half-wave rectified and passed through a conventional filter network indicated generally at 93. D.C. signals corresponding to the 400 cycle calibration signals appearing across resistor 68 are thus passed through signal connector 70, through the cable conductor 15 and through the filter 75 to the recording galvanometer 74 whereupon the variable resistor 76 may be adjusted to provide a galvanometer deflection which accurately corresponds to the known magnitude of the calibration signal.

In similar manner, with the stepping switch in the "calibrate" position, one side of resistor 67 is connected through conductor 89 and through switch section 81 to one side of the primary winding of transformer 86 while the other side of this primary winding is connected to switch section 82 and through signal connector 94 to the other side of the resistor 67. Thus, the constant current flowing to the measuring electrode 21 induces a voltage drop across resistor 67 which is applied directly across the primary of the transformer 86. The secondary of the transformer 86 supplies input signals to a push-pull amplifier 95 of conventional construction in order to develop A.C. signals which are passed through output transformer 96 to the other half of the rectifier tube 92. Thus, the signals appearing across the secondary of transformer 96 are half wave rectified and then are passed through a conventional filter 97 in order to produce D.C. signals for transmission to the surface equipment via conductor 16. With the manually operated switch 44 in its "operating" position the movable blade of switch section 45 is connected to its left contact as viewed in Fig. 2 and the cable conductor 16 thus supplies D.C. signals through a T-section filter 98 to a recording galvanometer 99 of the measuring device 36. The latter galvanometer is therefore supplied with an input signal of known magnitude and its deflection may be adjusted by varying potentiometer 100 shunted thereacross.

With the downhole stepping switch 77 in its third or "operating" position, that is, with the movable arms or blades of the switch sections in engagement with the contacts identified by reference numerals suffixed by the letter "c," the remote or reference electrode 37 is connected to one side of the primary of transformer 84 through switch section 80 while the measuring electrode 21 is connected to the other side of this primary through switch section 79 and through condenser 132. The latter condenser, if course, prevents natural earth potentials present at the electrodes 21 and 37 from affecting the A.C. signal supplied to the push-pull amplifier tube 90. The amplifier and rectifier circuit 38 is thus supplied with the A.C. difference of potential existing between the measuring electrode 21 and the remote or reference electrode 37 and, as previously indicated, this signal is converted to a D.C. signal which is passed through conductor 15 and is recorded by the measuring device 40 of the surface equipment.

Moreover, with the stepping switch 77 in the "operate" position, the self potential electrode 41 is connected through switch section 78 and through a T-section filter 101 to cable conductor 17. The filter 101, of course, prevents any A.C. signals from reaching conductor 17 and thus, insures that only the D.C. natural earth potential signals will be passed to the measuring circuit 42 at the surface. Conductor 17 at the earth's surface is connected through a second T-section filter 102 to a recording galvanometer 103 having its other side connected to a ground electrode as indicated at 104. An adjusting potentiometer 105 is connected in parallel with the galvanometer 103 for the purpose of adjusting or calibrating the measuring device 42. The D.C. signals supplied to the galvanometer 103 are recorded simultaneously with the resistivity signals supplied to the galvanometer 74, thereby to produce upon the record medium a second log or curve which exhibits the self potential signals as a function of borehole depth in side by side relationship with the apparent resistivity log produced by galvanometer 74.

The switch 77 as previously mentioned, is adapted to be actuated from the switch network 25 of the surface equipment. Thus, when it is desired to advance the stepping switch 77, the manually operated switch 44 is moved to its switching position; that is, with the movable blades of sections 43 and 45 in respective engagement with the contacts shown on the right in Fig. 2. With the switch 44 in its switching position the opposed poles of battery 106 are connected to conductors 15 and 16. The D.C. potential of the battery is thus applied across a series circuit consisting of resistors 107 and 108 and the operating coil of a D.C. operated relay 109 in the downhole equipment. When energized with the described D.C. potential, relay 109 is, of course, actuated to close its contact 110 in order to complete a circuit to the operating coil 111 of the stepping switch 77. It will be understood, of course, that the D.C. signals existing upon cables 15 and 16 when the manually operated switch 44 is in its operating position are of insufficient amplitude to energize the relay 109. When the contact 110 is closed the operating coil 111 is connected directly across conductors 15 and 16 and, hence, is supplied with current from the battery 106 with the result that the stepping switch 77 is advanced one step. The described advancement is accomplished by moving a solenoid armature 112 to rotate through an angle of 120°, a ratchet 113 having three spaced teeth on its peripheral surface. The ratchet 113 is fixedly mounted upon a shaft indicated at 114 which also carries the blades of the various sections of the switch 77. Thus, each time the manually operated switch 44 is moved from the "operating" to the "switch" position, the stepping switch 77 is advanced one step.

As previously indicated, in order to focus the current from the measuring electrode 21 in a horizontal direction that is, to force this current to flow in a thin sheet or disk extending from the electrode 21 in a direction perpendicular to the borehole 10, the screen electrodes 22 and 23 must be maintained at substantially the same electrical potential as the measuring electrode. As previously indicated, this is accomplished by measuring or sampling the potential difference existing in the vicinity of the current electrodes and by employing the output of this sampling means to control the supply of current to the screen electrodes. In the embodiment illustrated in Fig. 2 this sampling is effected by a transformer 32 having its primary connected to bridge the gap existing between electrode 21 and the interconnected screen electrodes 22 and 23. The elongated guard electrodes 22 and 23 may, of course, be replaced by point electrodes as employed in certain prior art systems and, in this case, the described sampling would be effected by measuring the potential difference existing between electrodes spaced from and located between the measuring electrode and the guard electrode. Thus, in the appended claims the term "means for sampling the potential difference existing in the vicinity of the measuring electrode" is intended to encompass both the latter type sampling and the sampling means illustrated in Fig. 2 wherein a sample is made of the potential difference existing between the electrode 21 and the screen electrodes. In any event, in the arrangement illustrated in Fig. 2, the signals appearing across the secondary of the transformer 32 are transformer coupled to the input of the preamplifier 33. Specifically, the secondary of the transformer 32 is connected directly across the primary winding of a transformer 120 the secondary of which is adapted to supply input signals to a push-pull amplifier stage 121. The latter amplifier stage is resistance coupled to a second amplifying stage 122 which also forms a part of the pre-amplifier 33 referred to above. The output signals of the amplifying stage 122 are coupled through condensers 124 and 125 to the control grids of a pair of push-pull connected tubes 126 and 127 in the control circuit 34. The output of the tubes 126 and 127 is developed across the primary winding of a transformer 128 having one side of its secondary connected to ground as indicated at 49 and having the other side of its secondary connected via conductor 129 to the screen electrodes 22 and 23. The current flow through the conductor 129 is adapted to maintain the screen electodes 22 and 23 at essentially the same potential as the measuring electrode 21 in order to provide the above described focusing of the measuring current. The difference of potential existing between electrode 21 and the screen electrodes 22 and 23 is held to a minimum and its exact value is a function of the amplification provided by the amplifier 33 and the control circuit 34.

As previously indicated, under extreme conditions of formation resistivity it is impossible for the control circuit 34 to supply sufficient current to the guard electrodes to maintain the screen electrodes at the same potential as the measuring electrode 21. Under these extreme conditions a portion of the current which should flow through the measuring electrode 21 will actually be diverted through the primary winding of the transformer 32 and through the guard electrodes 22 and 23 to ground. As a result of these extreme conditions, two errors will be introduced into the resistivity measurements provided by the measuring device 40. The first such error is caused by the fact that a sizable portion of the current intended for the measuring electrode 21 is actually flowing through the guard electrodes 22 and 23 so that the measuring current is no longer constant. The second such error, of course, results from the fact that a potential difference exists between the guard electrode and the measuring electrode. The latter error is maintained relatively small by designing the primary of the transformer 32 to have an extremely small impedance with the result that a considerable portion of the current intended for the measuring electrode 21 may flow through the primary of the transformer 32 while still maintaining the potential difference existing between the measuring electrode and the screen electrodes at a small value.

In accordance with an important feature of the present invention the first error described above is corrected by making a second measurement which is indicative of the amount of current diverted from the measuring electrode 21. To provide the latter measurement the output voltage of the preamplifier 33 is supplied to the amplifier and rectifier circuit 35 and through signal conductor 16 to the measuring device 36. Specifically, the output of the preamplifier 33 is connected via signal conductors 130 and 131 to switch contacts 81c and 82c. Thus, when the stepping switch 77 is in its "operating" position, the input transformer 86 of the amplifier and rectifier circuit 35 is supplied with the output signals of the preamplifier 33. These signals are converted to a slowly varying D.C. signal which is passed through the cable conductor 16 and is recorded by the galvanometer 99 simultaneously with the resistivity measurement recorded by the galvanometer 74. The signal recorded by the galvanometer 99 is calibrated in terms of percent of the intended current flow to the measuring electrode 21. Thus, for example, let it be assumed that the curve produced by the device 36 indicates that 80 percent of the current intended for the measuring electrode 21 is flowing through the primary of the transformer 32. Under these conditions only 20 percent of the desired current is passing from the measuring electrode 21 to the formations, and, accordingly, the reading or curve provided by the device 40 must be corrected to that which would be obtained if the proper current flow were passing from the measuring electrode 21. The correction is, of course, obtained, under the conditions assumed above, by multiplying the resistivity measurement effected by the device 40 by a factor of 5. In this manner, the galvanometer 99 produces a third curve or log on the record medium containing information concerning the amount of current diverted from the measuring electrode 21 and, from this curve, a correction factor is derived which must be applied to the apparent resistivity measurements recorded by the galvanometer 74 in order to obtain the true resistivity.

In view of the foregoing description, it will be recognized that the apparatus of the present invention is operated by first lowering the downhole equipment 12 to any desired depth in the borehole. This is done with the stepping switch 77 in its "off" position so that no signals are supplied through the cable 13 to the surface equipment 20. When the downhole equipment 12 has reached the desired depth the manually operated switch 44 may be temporarily placed in its "switch" position in order to advance the stepping switch one step from the "off" to the "calibrate" position at which time the measuring circuits of the surface equipment may be calibrated in the manner described above. After the calibration has been completely the manually operated switch 84 is again momentarily placed in its "switch" position in order to advance the stepping switch from the "calibrate" to the "operate" position. When the stepping switch has been moved to the operate position the manually operated switch 44 is, of course, returned to its "operating" position and the downhole equipment 12 is then moved through the borehole 10 at any desired rate. At the same time the medium upon which the logging signals are to be recorded is moved past the recording galvanometers 74, 99 and 103 at a rate corresponding to the rate of movement of the downhole equipment 12. The resistivity signals appearing upon conductor 15, the correction signals appearing upon conductor 16 and the self potential signal appearing upon conductor 17 are, of course, continuously recorded upon the moving record medium, thereby to provide three side by side traces or curves which may be used to determine the nature, extent and location of the various sub-surface strata penetrated by the borehole 10. The strength of the apparent resistivity signals is such that these signals fall within the linear range of operation of the galvanometer 74 with the result that these measurements can be easily read and interpreted. As previously indicated, the signals recorded by the galvanometer 99 are then used to correct the apparent resistivity indications in order to obtain the true resistivity for each sub-surface stratum.

While a particular embodiment of the invention has been shown and described, it will be recognized that various modifications will readily occur to those skilled in this art and it is therefore intended by the appended claims to cover any such modifications as fall within the true spirit and scope of the present invention.

What is claimed as new and desired to be secured by Letters Patent of the United States is:

1. Apparatus for logging formations adjacent a borehole or the like comprising surface equipment; downhole apparatus; and a cable adapted to lower said downhole apparatus into the borehole and having a plurality of conductors connecting said surface equipment to said downhole apparatus; means including a source of alternating current in the surface equipment for supplying current through a first of said conductors for flow from at least one emitting point to said formations; a reference electrode disposed at a point electrically remote from the emitting point; a first amplifying means in the downhole apparatus for amplifying the potential difference existing between the reference electrode and a point in the vicinity of the emitting point; means for rectifying the output of the first amplifying means to produce direct current signals for transmission through said cable to the surface equipment; a measuring device in the surface equipment responsive to said direct current signals for providing a resistivity measurement; first and second current electrodes disposed symmetrically above and below the emitting point; means for delivering current to said first and second electrodes in order to establish first and second electric fields which force current from the emitting point to flow in a direction extending substantially perpendicular to the borehole; means including a transformer having a low primary impedance for sampling the electric field existing in the vicinity of the emitting point; second amplifying means in the downhole apparatus for amplifying the signals appearing across the secondary of said transformer, and means responsive to signals from said second amplifying means for controlling the current flowing to said first and second electrodes in order to maintain the potential difference between said emitting point and each of said first and second electrodes substantially at zero.

2. The apparatus defined by claim 1 wherein the input to said first amplifying means passes through a switch which is actuated from the surface by current flow through at least one of the conductors of said cable and an impedance connected in series with said first conductor cooperates with said switch to supply an AC signal of predetermined magnitude to said first amplifying means in order to permit calibration of said second measuring device.

3. Apparatus for logging formations adjacent a borehole or the like comprising surface equipment; downhole apparatus; and a cable adapted to lower said downhole apparatus into the borehole and having a plurality of conductors connecting said surface equipment to said downhole apparatus; means including a source of alternating current in the surface equipment for supplying current through a first of said conductors for flow from at least one emitting point to said formations; a reference electrode disposed at a point electrically remote from the emitting point; a self potential electrode in the downhole apparatus; a first measuring device in the surface equipment connected through a second of said cable conductors to said self potential electrode for measuring natural earth potentials; a first amplifying means in the downhole apparatus for amplifying the potential difference existing between the reference electrode and a point in the vicinity of the emitting point; means for rectifying the output of the first amplifying means to produce direct current signals for transmission through said cable to the surface equipment; a second measuring device in the surface equipment responsive to said direct current signals for providing a resistivity measurement; first and second current electrodes disposed symmetrically above and below the emitting point; means for delivering current to said first and second electrodes in order to establish first and second electric fields which force current from the emitting point to flow in a direction extending substantially perpendicular to the borehole; means including a transformer having a low primary impedance for sampling the electric field existing in the vicinity of the emitting point; second amplifying means in the downhole apparatus for amplifying the signals appearing across the secondary of said transformer; and means responsive to signals from said second amplifying means for controlling the current flowing to said first and second electrodes in order to maintain the potential difference between said emitting point and each of said first and second electrodes substantially at zero.

4. Apparatus for logging formations adjacent a borehole or the like comprising surface equipment; downhole apparatus; and a cable adapted to lower said downhole apparatus into the borehole and having a plurality of conductors connecting said surface equipment to said downhole apparatus; means for passing alternating current from at least one emitting point to said formations adjacent to borehole; a reference electrode disposed at a point electrically remote from the emitting point; a signal transmission circuit responsive to the potential difference existing between the reference electrode and a point in the vicinity of the emitting point for transmitting signals representative of the resistivity of the formations through said cable to the surface equipment; a measuring device in the surface equipment responsive to said signals for providing a resistivity measurement; first and second current electrodes disposed symmetrically above and below the emitting point; means for delivering current to said first and second electrodes in order to establish first and second electric fields which force current from the emitting point to flow in a direction extending substantially perpendicular to the borehole; means including a transformer having a low primary impedance for sampling the electric field existing in the vicinity of the emitting point; and means in the downhole apparatus responsive to the signals appearing across the secondary of said transformer for controlling the current flowing to said first and second electrodes in order to maintain the potential difference between said emitting point and each of said first and second electrodes substantially at zero.

5. The apparatus defined by claim 4 which additionally includes a self potential measuring electrode in the downhole equipment spaced from said first and second electrodes, and a measuring circuit responsive to signals from said self potential electrode for measuring natural earth potentials simultaneously with the resistivity measurements.

6. Apparatus for logging formations adjacent a borehole or the like comprising surface equipment; downhole apparatus; and a cable adapted to lower said downhole apparatus into the borehole and connecting said surface equipment to said downhole apparatus; means including a source of alternating current in the surface equipment for supplying current to a current electrode in the downhole apparatus from which the current flows into the borehole formations; means for providing a series of apparent resistivity indications in response to potential differences created by current flow from the current electrode as the downhole apparatus is moved through the borehole; first and second elongated, electrically connected guard electrodes disposed symmetrically above and below the current electrode; means for delivering current to said guard electrodes in order to establish first and second electric fields which force current from the current electrode to flow in a direction extending substantially perpendicular to the borehole; a transformer having a primary winding connected between the guard electrodes and the current electrode, means responsive to signals from a secondary winding of said transformer for controlling the current flowing to said guard electrodes in order to maintain the potential difference between said current electrode and each of said guard electrodes substantially at zero, a signal transmission circuit responsive to signals from said transformer for developing and transmitting to the surface equipment signals indicative of the amount of current diverted from said current electrode through the primary winding of said transformer; and a measuring circuit at the earth's surface responsive to the last named signals for providing a series of indications which may be used to correct the apparent resistivity indications to correspond to the true formation resistivities.

7. Apparatus for logging formations adjacent a borehole or the like comprising surface equipment; downhole apparatus; and a cable adapted to lower said downhole apparatus into the borehole and connecting said surface equipment to said downhole apparatus; means including a source of alternating current in the surface equipment for supplying current to a current electrode in the downhole apparatus from which the current flows into the borehole formations; means for providing a series of apparent resistivity indications in response to potential differences set up by current flow from said current electrode as said downhole apparatus is moved through the borehole; first and second electrically connected screen electrodes disposed symmetrically above and below the current electrode; means for sampling the electric field existing in the vicinity of the current electrode; means responsive to signals from the sampling means for delivering current to said screen electrodes in order to maintain the potential difference between said current electrode and each of said screen electrodes substantially at zero, a signal transmission circuit responsive to signals from said sampling means for developing signals indicative of the amount of current delivered to the screen electrodes; and a measuring circuit at the earth's surface responsive to the last named signals for providing a series of indications which may be used to correct the apparent resistivity indications to correspond to the true formation resistivities.

8. Apparatus for logging formations adjacent a borehole or the like comprising surface equipment; downhole apparatus; and a cable adapted to lower said downhole apparatus into the borehole and connecting said surface equipment to said downhole apparatus; means including a source of alternating current in the surface equipment for supplying current to a current electrode in the downhole apparatus from which the current flows into the borehole formations; a reference electrode disposed at a point electrically remote from the current electrode; a first signal transmission circuit responsive to the potential difference existing between the reference electrode and a point near the current electrode for providing an apparent resistivity measurement; first and second electrically connected guard electrodes disposed symmetrically above and below the current electrode; means for sampling the electric field existing in the vicinity of the current electrode; means responsive to signals from the sampling means for delivering current to said guard electrodes in order to maintain the potential difference between said current electrode and said guard electrodes substantially at zero; a second signal transmission circuit responsive to signals from said sampling means for transmitting to the surface signals indicative of the amount of current delivered to the screen electrodes; and a measuring circuit at the earth's surface responsive to the last named signals for providing an indication which may be used to correct the apparent resistivity measurements to correspond to the true formation resistivities.

9. Apparatus for logging formations adjacent a borehole or the like comprising surface equipment; downhole apparatus; and a cable adapted to lower said downhole apparatus into the borehole and connecting said surface equipment to said downhole apparatus; means including a source of alternating current in the surface equipment for supplying current to a current electrode in the downhole apparatus from which the current flows into the borehole formations; a reference electrode disposed at a point electrically remote from the emitting point; a first signal transmission circuit responsive to the potential difference existing between the reference electrode and the current electrode for providing an apparent resistivity measurement; first and second electrically connected elongated, guard electrodes disposed symmetrically above and below the current electrode; a transformer having its primary winding connected between the guard electrodes and the current electrode; means responsive to signals from the transformer for delivering current to said guard electrodes in order to maintain the potential difference between said current electrode and each of said guard electrodes substantially at zero; a second signal transmission circuit responsive to signals from said transformer for developing signals indicative of the amount of current diverted from said current electrode through the primary winding of said transformer; and a measuring circuit at the earth's surface responsive to the last named signals for providing an indication which may be used to correct the apparent resistivity measurements to correspond to the true formation resistivities.

10. Apparatus for logging formations adjacent a borehole or the like comprising surface equipment; downhole apparatus; and a cable adapted to lower said downhole apparatus into the borehole and having a plurality of conductors connecting said surface equipment to said downhole apparatus; means including a source of alternating current in the surface equipment for supplying current through a first of said conductors to a current electrode in the downhole apparatus from which the current flows into the borehole formations; a reference electrode disposed at a point electrically remote from the current electrode; a first amplifying means in the downhole apparatus for amplifying the potential difference existing between the reference electrode and a point near the current electrode; means for rectifying the output of the first amplifying means to produce direct current signals for transmission through said cable to the surface equipment; a first measuring device in the surface equipment responsive to said direct current signals for providing an apparent resistivity measurement; first and second electrically connected screen electrodes disposed symmetrically above and below the current electrode; means for sampling the electric field existing in the vicinity of the current electrode, a second amplifying means in the downhole apparatus for amplifying the signals from the sampling means; means responsive to signals from the second amplifying means for delivering current to said screen electrodes in order to maintain the potential difference between said current electrode and each of said screen electrodes substantially at zero; a third amplifying means responsive to signals from the sampling means for developing signals indicative of the amount of current supplied to the screen electrodes; means for rectifying the output of the third amplifying means; and a second measuring circuit at the earth's surface responsive to the output of the last named rectifying means for providing an indication which may be used to correct the apparent resistivity measurements to correspond to the true formation resistivities.

11. Apparatus for logging formations adjacent a borehole or the like comprising surface equipment; downhole apparatus; and a cable adapted to lower said downhole apparatus into the borehole and having a plurality of conductors connecting said surface equipment to said downhole apparatus; means including a source of alternating current in the surface equipment for supplying current through a first of said conductors to a current electrode in the downhole apparatus for passage into the borehole formations; a reference electrode disposed at a point electrically remote from the current electrode; a first amplifying means in the downhole apparatus for amplifying the potential difference existing between the reference electrode and the current electrode; means for rectifying the output of the first amplifying means to produce direct current signals for transmission through said cable to the surface equipment; a first measuring device in the surface equipment responsive to said direct current signals for providing an apparent resistivity measurement; first and second electrically connected, elongated guard electrodes disposed symmetrically above and below the current electrode; means for delivering current to said guard electrodes in order to establish first and second electric fields which force current from the current electrode to flow in a direction extending substantially perpendicular to the borehole: a transformer having a low impedance primary winding connected between the guard electrodes and the current electrode; a second amplifying means in the downhole apparatus for amplifying the signals appearing across a secondary winding of said transformer; means responsive to signals from the second amplifying means for controlling the current flowing to said guard electrodes in order to maintain the potential difference between said current electrode and said guard electrodes substantially at zero; a third amplifying means responsive to signals from said transformer for developing an output indicative of the amount of current diverted from said current electrode through the primary winding of said transformer; means for rectifying the output of the third amplifying means; and a second measuring circuit at the earth's surface responsive to the output of the last named rectifying means for providing an indication which may be used to correct the apparent resistivity measurements to correspond to the true formation resistivities.

12. In an apparatus for logging formations adjacent a borehole or the like, the combination of surface equipment; downhole apparatus; and a cable adapted to raise and lower said downhole apparatus within the borehole and to connect said surface equipment to said downhole apparatus; a current electrode in the downhole apparatus; means for supplying current to said current electrode for passage into the borehole formations; means for providing apparent resistivity indications in response to potential differences set up by current flow from said current electrode as said downhole apparatus is moved through the borehole; first and second screen electrodes disposed respectively above and below the current electrode; means for sampling the electric field existing in the vicinity of the current electrode; means responsive to signals from the sampling means for delivering current to said screen electrodes in order to maintain the potential difference between said current electrode and each of said screen electrodes substantially at zero; a signal transmission circuit responsive to signals from the sampling means for delivering an output indicative of the amount of current delivered to the screen electrodes; and a measuring circuit in the surface equipment responsive to the output of said signal transmission circuit for providing indications which may be used to correct the apparent resistivity indications to correspond to the true formation resistivities.

References Cited in the file of this patent

UNITED STATES PATENTS 2,592,125    Doll _____ Apr. 8, 1952
2,707,768    Owen _____ May 3, 1955